United States Patent [19]

Schnizler, Jr. et al.

[11] 4,116,454
[45] Sep. 26, 1978

[54] CHUCK FOR HAMMERDRILLS AND THE LIKE

[75] Inventors: Albrecht Schnizler, Jr., Nürtingen; Klaus Bartmann, Neuffen-Kappishäusern, both of Fed. of Germany

[73] Assignee: Metabowerke KG Closs Rauch & Schnizler, Nürtingen, Fed. Rep. of Germany

[21] Appl. No.: 781,445

[22] Filed: Mar. 25, 1977

[30] Foreign Application Priority Data

Apr. 1, 1976 [DE] Fed. Rep. of Germany ....... 2614030

[51] Int. Cl.$^2$ .............................................. B23B 5/22
[52] U.S. Cl. ................................................. 279/62
[58] Field of Search ................................. 279/61, 62

[56] References Cited

U.S. PATENT DOCUMENTS 3,938,817  2/1976  Rohm ................................. 279/61
3,992,020  11/1976  Derbyshire ........................... 279/61

Primary Examiner—Harold D. Whitehead
Attorney, Agent, or Firm—Michael J. Striker

[57] ABSTRACT

A chuck for hammerdrills and the like is provided with a chuck body; a plurality of jaws on said chuck body for engaging and holding a tool bit; and means connected to said jaws for adjusting the engagement of said jaws with the tool bit, said means comprising a guide sleeve having a main portion with an outer and inner surface, said main portion defining a central axis therethrough, a toothed gear encircled by said sleeve and having a circumferentially extending groove having a roughened surface facing the inner surface of said sleeve, said sleeve including at least one inwardly offset locking portion having an outer and inner surface which are inwardly offset with respect to the main portion of said sleeve, said inwardly offset portion projecting into said groove.

14 Claims, 2 Drawing Figures

CHUCK FOR HAMMERDRILLS AND THE LIKE

BACKGROUND OF THE INVENTION

The present invention relates generally to a chuck and more particularly to a chuck which is especially suitable for use in hammer drills and the like.

The chuck has a toothed gear, a sleeve and adjustable jaws.

An attempt has been made to provide a formlocking connection between the sleeve and the toothed gear by injecting metal between a recess of the sleeve and a groove of the gear teeth. This proposal has produced a connection having outstanding properties, but the connection is expensive to produce.

It has also been proposed that synthetic resin be substituted for the metal of the previous proposal. However, this substitution is disadvantageous because the connection between the toothed gear and the sleeve can be imperiled by the effect of heat.

SUMMARY OF THE INVENTION

It is therefore a general object of this invention to overcome the disadvantages pertaining to cost or structure of the prior art.

More particularly, it is an object of the invention to provide an improved chuck which is especially suitable for use in hammerdrills and the like, and which avoids the aforesaid disadvantages.

In particular, it is an object of the present invention to provide a chuck which has a simply produced and highly impact resistant connection between the sleeve and the gear teeth of the chuck.

In keeping with these objects, and with others which will become apparent hereafter, one feature of the invention resides in a chuck for hammerdrills and the like which, briefly stated, comprises a chuck body having two ends, one of which is connected to a power tool, and also having a plurality of jaws mounted on the chuck body and projecting beyond the other end of the chuck body in order to engage and hold a tool bit. A sleeve turnably surrounds the chuck body.

In order to prevent independent movement of the sleeve relative to the toothed gear, the toothed gear is provided with a circumferentially extending groove. Circumferentially spaced portions of the sleeve distributed about the groove are pressed into the groove by means of localized plastic deformation. Because of the localized nature of the plastic deformation, the form required for the indentation is not so great as to constitute a risk that the usually hardened toothed gear will break. Through this plastic deformation of the sleeve, the sleeve and the gear can be connected with a sufficiently high friction contact that the sleeve cannot slide relative to the gear even in the case of the highest impact stress.

By means of stamping, the plastic deformation can be produced particularly inexpensively with low expense for equipment. In order to be able to connect even relatively thin-walled sleeves, particularly those of sheet metal, with the toothed gear, the stamping surface of the stamping device has a bottom face which merges via rounded portions into side faces of the stamping surface, so that undesirable punching or cutting effects are not caused and so that fissures are not formed at the locations of greatest deformation. If not obviated, such fissures could lead to fatigue fracture.

In order to achieve a secure rotary connection, particularly with thin-walled sleeves, at least a portion of the groove can be roughened so that a kind of external toothing or serrations appear. Customarily, the gear is at least surface-hardened; hence, the roughening will not be worn or deformed off to any great degree.

In order to achieve an adequate amount of holding surface contact, the plastically deformed inward projections preferably extend parallel to the circumferentially extending groove since the groove in the gear is constructed to be relatively narrow. In tests, it has been found that six distributed plastic deformations upon the periphery of the sleeve are sufficient.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
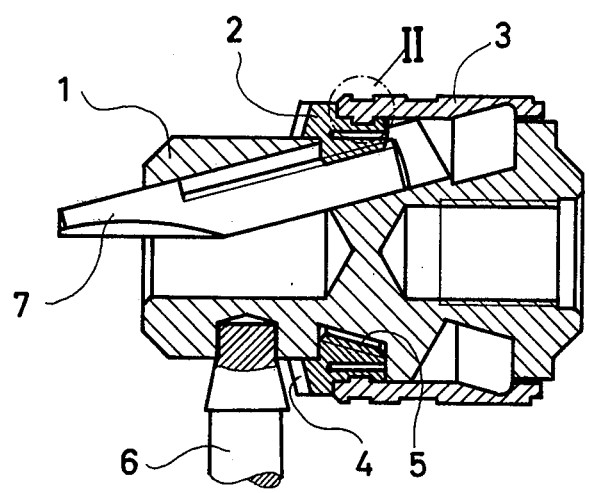
FIG. 1 is a cross sectional view through the inventive chuck.

Referring to FIG. 1 in detail, it will be seen that reference numeral 1 identifies a body of the illustrated chuck. Toothed gear 2 is rotatably supported in the body 1. The toothed gear 2 is firmly connected with sleeve 3. The sleeve 3 is supported upon the body 1 and is used to properly guide the gear 2.

The gear 2 has an external toothing 4 and a conical internal thread 5. The gear 2 can be turned by means of a key 6 which meshes with the external toothing 4. Jaws 7 are thereby moved by means of the internal threading 5.

Figure 2:
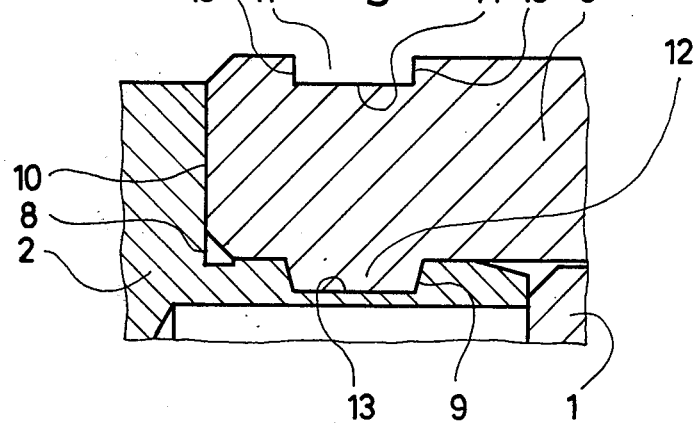
FIG. 2 is a partial cutaway view of the encircled portion II of FIG. 1.

To assure a secure connection between sleeve 3 and gear 2, the gear 2 is provided with a circumferentially extending groove 9 parallel to a shoulder 8. In FIG. 2, the groove has a trapezoidal cross-section. The interface 10 of the sleeve 3 lies against the shoulder 8 of the gear 2. At several locations, say perhaps six locations, the sleeve 3 is plastically deformed in the area of the groove 9 through an impression 11 with a corresponding displacement of plastic to form the projection 12 extending into the groove 9. Therefore, a secure, interlocking and frictional connection is achieved between sleeve 3 and gear 2. The impression 11 extends across the groove 9 and is, for example, 6 mm long, 2 mm wide and 0.5 mm deep when the wall thickness of the sleeves is about 3.5 mm.

Additionally, for a secure rotary connection, the bottom 13 of the groove 9 can be roughened. Since the gear 2 has at least a hardened surface, the tips of the roughened portions penetrate the material of the sleeve so that then a form-locking rotary connection is developed and even with a thin-walled sleeve of sheet metal, a secure, strongly impact or vibratory stress resistant connection is securely formed between sleeve 3 and gear 2. Particularly with thin-walled sleeves 3, the bottom 14 in the side walls 15 of the impression 11 is rounded so that deleterious stamping effects and development of fissures which could easily lead to fatigue failure do not occur at the displaced portions of the sleeve as a result of the deformation produced by the stamping.

It will be understood that each of the elements described above, or two or more together, may also find a useful application in other types of constructions differing from the types described above.

While the invention has been illustrated and described as embodied in a chuck for hammerdrills and the like, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A chuck for hammerdrills and the like, comprising in combination, a chuck body; a plurality of jaws on said chuck body for engaging and holding a tool bit; and means connected to said jaws for adjusting the engagement of said jaws with the tool bit, said means comprising a guide sleeve having a main portion with an outer and inner surface, said main portion defining a central axis therethrough, a toothed gear encircled by said sleeve and having a circumferentially extending groove facing the inner surface of said sleeve, said groove having a bottom which is at least partially roughened, said sleeve including at least one inwardly offset locking portion having an outer and inner surface which are inwardly offset with respect to the main portion of said sleeve, said inwardly offset portion projecting into said groove and engaging the roughened bottom of said groove.

2. A chuck as defined in claim 1, wherein said locking portion is an inwardly stamped portion of said sleeve.

3. A chuck as defined in claim 2, wherein the outer surface of said locking portion includes a bottom portion merging into side portions.

4. A chuck as defined in claim 2, wherein the outer surface of said locking portion defines a circumferentially extending groove of approximately triangular cross-section extending parallel to the groove in said gear.

5. A chuck as defined in claim 1, wherein the inner surface of said locking portion extends in surface contact across the bottom of the circumferentially extending groove.

6. A chuck as defined in claim 3, wherein said outer surface of said locking portion extends parallel to said groove of said gear.

7. A chuck as defined in claim 1, wherein said locking portion extends parallel to the circumferentially extending groove and said locking portion has a circumferential length greater than its axial width.

8. A chuck as defined in claim 1, including six locking portions circumferentially distributed about said sleeve.

9. A chuck as defined in claim 1, wherein the outer surface of said locking portion defines a circumferentially extending groove of approximately rectangular cross-section extending parallel to said groove in said gear.

10. A chuck as defined in claim 12, said roughened bottom having protrusions provided with tips which penetrate the body of said inwardly offset portion of said sleeve, whereby a form-locking rotary connection is developed between said sleeve and said gear to thereby resist impact or vibratory stress and to consequently prevent sliding of said sleeve relative to said gear.

11. A chuck as defined in claim 12, said bottom having teeth extending therefrom so as to form a roughened portion.

12. A chuck as defined in claim 14, said teeth being serrated.

13. A chuck as defined in claim 12, said gear being surface-hardened so as to strengthen said roughened bottom for resistance to wear and deformation.

14. A chuck as defined in claim 12, said groove of said gear having a trapezoidal cross section, said inwardly offset portion including a projection extending into and filling said groove of said gear, said projection also having a trapezoidal cross-section.

* * * * *